C. BERG.
RAT EXTERMINATOR.
APPLICATION FILED DEC. 16, 1915.

1,220,593.   Patented Mar. 27, 1917.

Inventor
Carl Berg
By John A. Donegan,
Attorney

UNITED STATES PATENT OFFICE.

CARL BERG, OF BROOKLYN, NEW YORK, ASSIGNOR TO THE BERG & BEARD MANUFACTURING COMPANY, INC., OF BROOKLYN, NEW YORK, A CORPORATION OF NEW YORK.

RAT-EXTERMINATOR.

1,220,593.      Specification of Letters Patent.      Patented Mar. 27, 1917.

Application filed December 16, 1915. Serial No. 67,136.

*To all whom it may concern:*

Be it known that I, CARL BERG, a citizen of the United States, residing at Brooklyn, county of Kings, and State of New York, have invented new and useful Improvements in Rat-Exterminators, of which the following is a specification.

This invention has relation to rat exterminators, where heretofore in preparing compositions of matter designed to exterminate rats and mice, all regard has been given either to the deadly properties of the individual components of the composition, or to an arrangement whereby the composition approximated in appearance a piece of food. In no event has an attempt been made to have the composition conform in point of flavor and appearance to the article of food desired to be imitated. Now when it is remembered that rats in selecting their food are guided solely by the sense of smell rather than by what they see, then the reason will be obvious why those exterminators composed of poisonous non-food smelling substances, and formed in the shape of well known articles of food, have failed to entice the rats to partake thereof.

Coming now to the present invention, the general object thereof is to provide an exterminator which will have both the flavor and substantially all the physical characteristics of a piece of meat. And to this end the invention resides in providing a body of relatively soft but firm material, a food flavoring substance, and a toxic substance. The said material and substances being so combined as to entice rats readily to partake thereof, and then operate to deceive the rat into the notion that the substance, being eaten, is harmless food.

Figure 1:
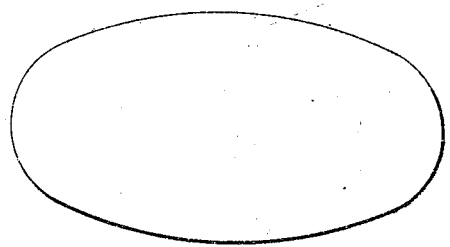
Figure 2:
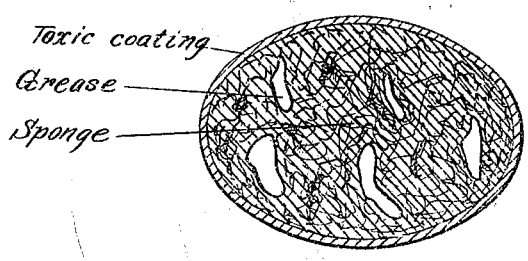

In the accompanying drawings, Figure 1, represents a plan view of one embodiment of the composition; and Fig. 2, shows a vertical cross sectional view of the same.

The body portion of the composition is preferably of sponge, the flavoring is preferably formed of animal grease and the toxic substance is by preference barium carbonate.

The cohesive property of sponge approximates that of meat, as for instance, smoked ham. In other words sponge will present no greater resistance to being chewed by the animal than would a piece of raw meat. In addition to this, sponge has great absorptive properties and, when saturated with a flavoring substance is thereby enabled, even while being chewed, to retain sufficient flavor to affect the sense of taste throughout the act of chewing. Moreover sponge after having been swallowed into the stomach will yield the digestible flavoring substance, with which it is saturated, to the action of the digestive juices, but by reason of its being practically indigestible will absorb from the stomach the fluid substances not taken up by the circulation and thereby create thirst.

The flavoring substance of the composition consists of a compound containing two parts of rendered beef suet, and one part of bacon.

A suitable composition may be prepared in accordance with the following illustrative specific formula, it being understood that the proportions of the same may be substantially varied without departing from the scope of this invention:

| | |
|---|---|
| Sponge | 10 lbs. |
| Beef suet | 20 " |
| Bacon | 5 " |
| Corn starch | 6 " |
| Barium carbonate | 2 " |

The mass of sponge is comprised of pieces each approximating the size of a walnut. The suet and bacon are melted together in a suitable receptacle by the action of heat. While the grease is hot and in a substantially liquid state the mass of sponge is added thereto. It will be understood that the pieces of sponge, prior to immersing them in the grease, are dry so that the substantially fluid grease will be readily absorbed upon mixing the pieces of sponge therewith. The mass of saturated sponge, when sufficiently cool to permit of the ready handling thereof, is transferred to a second receptacle and in being so transferred sufficient hand pressure is applied to effect the removal of such a quantity of the grease as will leave the pieces of sponge in a moist and damp condition. The barium carbonate and the corn starch are mixed together and the application of this mixture to the pieces of sponge is effected by agitating the mass of sponge and dusting the mixture thereonto.

From the foregoing it will be observed that an attractive and efficient exterminator is provided. The relatively small amount of barium carbonate incorporated with each piece of sponge is insufficient to produce harmful effects in the event of being devoured by domestic animals such as dogs or cats. But the amount is sufficient to produce the desired toxic effect when taken into the stomach by a rat or mouse. Thus it will be seen that the barium carbonate coöperates with the sponge to create thirst when the composition is devoured by a rodent, and since the presence of thirst compels the rodent that has devoured the composition of the present invention, to seek water, the undesirable feature of having rats or mice die in their nests or in the immediate vicinity of the place where the exterminator has been distributed, is avoided.

What is claimed as new is:

1. A rodent exterminator having the general appearance of scraps of meat and comprising sponge, animal grease and a toxic substance, the sponge being saturated with the grease and the toxic substance forming a coating for the sponge.

2. A rodent exterminator having the general appearance of scraps of meat and comprising sponge, animal grease and a mixture including barium carbonate and a vegetable substance in powdered form, the said sponge being saturated by the grease and the mixture forming the coating for the sponge.

3. A rodent exterminator having the general appearance of scraps of meat and comprising sponge, a baiting substance including a mixture of animal grease and meat and a toxic compound including barium carbonate and powdered vegetable matter, said sponge being saturated with the baiting substance and the toxic compound forming a coating for the sponge.

In testimony whereof, I have signed my name to this specification in the presence of two subscribing witnesses, this 15th day of December, 1915.

CARL BERG.

Witnesses:
ALICE ADAMS,
M. E. LAUGHLIN.